United States Patent

[11] 3,628,866

| [72] | Inventor | Rolf K. Mueller |
| | | Brighton, Mich. |
| [21] | Appl. No. | 793,779 |
| [22] | Filed | Jan. 24, 1969 |
| [45] | Patented | Dec. 21, 1971 |
| [73] | Assignee | The Bendix Corporation |

[54] NONCONTACTING METHOD OF MEASURING STRAIN
4 Claims, 5 Drawing Figs.

[52] U.S. Cl. .................................................. 356/32,
73/88 (O), 350/162, 331/94.5
[51] Int. Cl. ........................................................ G01b11/16,
G02b 5/10
[50] Field of Search ............................................ 356/32;
350/162; 73/88 (O); 331/94.5

[56] References Cited
UNITED STATES PATENTS
3,184,961 5/1965 Bell ................................ 356/32

3,453,640 7/1969 Blackmer .................... 350/162
3,458,257 7/1969 Pryor ............................. 356/32

OTHER REFERENCES

Nicholas George et al., " Holographic Diffraction Gratings," Applied Physics Letters, Vol. 9, No. 5, Sept. 1, 1966, pp. 212–215

Gerritsen et al., " Thermally Engraved Gratings Using a Giant-Pulse Laser," J. Applied Physics, Vol. 38, No. 5, Apr. 1967, pp. 2,054–2,058.

Primary Examiner—Ronald L. Wibert
Assistant Examiner—J. Rothenberg
Attorneys—William F. Thornton and Plante, Arens, Hartz, Smith & Thompson ABSTRACT: A noncontacting method for measuring strain in a workpiece wherein strain measurements are based on an optical diffraction grating produced by interfering beams from a giant-pulse laser thereby enabling the thermal engraving of diffraction gratings on irregularly shaped surfaces.

INVENTOR
ROLF K. MUELLER

INVENTOR.
ROLF K. MUELLER
BY William F. Thornton
ATTORNEY

NONCONTACTING METHOD OF MEASURING STRAIN

The principal object of this invention is to provide an improved method for measuring strain in workpieces by the utilization of a laser engraved diffraction grating on the workpiece.

It is known to employ diffraction gratings in strain measurement techniques. However, past practice has involved the formation of such gratings by mechanical and similar procedures, thereby limiting the techniques to only substantially flat surfaces and certain environments which permitted the formation of gratings in this manner. It is also known to employ giant-pulse lasers for forming gratings on a solid surface, and one technique is disclosed in an article entitled "Thermally Engraved Gratings Using a Giant-Pulse Laser" in Journal of Applied Physics, Vol. 38, No. 5, Apr. 1967. However, this publication does not disclose a noncontacting method for measuring strain in a workpiece utilizing the laser produced grating for light diffraction purposes.

In the method of this invention, optical diffraction gratings are formed for strain measurement purposes by interfering beams from a giant-pulse laser source. The beams are made to interfere at the surface to be measured so that they function to generate sufficient heat to vaporize the surface material and engrave the desired grating directly on the workpiece surface. When the test surface is a planar surface, a grating is generated consisting essentially of parallel grooves. When the test surface is curved or irregular, namely, nonplanar, a more complex groove pattern that is also referred to herein as a "-grating" for convenience of description, which has the characteristic of scattering a plane wave impinging under a certain angle into another plane wave, is produced. The latter plane wave shows the necessary sensitivity to distortions of the workpiece. A CW gas laser located where the giant-pulse laser was located for forming the diffraction grating serves as the monochromatic light source for diffraction thereby insuring a highly sensitive strain measurement because the original setup is essentially regenerated.

Thus, the present invention is advantageous because it eliminates the previous difficulty in the strain measuring art of obtaining gratings with close and uniform spacing and enables the formation of gratings by a noncontacting technique on nonplanar surfaces requiring no initial preparation.

In the method of this invention, the giant-pulse laser beam is split into two paths and then united at the specimen surface at a small angle. The path difference between the two beams is adjusted to less than the coherence length of the laser. Two interfering plane waves set up a standing wave pattern that causes evaporation of material from the workpiece surface in regions of high intensity. By utilizing a CW gas laser as a source of monochromatic light, the characteristics of the pattern of light diffracted off the thermally engraved surface can be measured to provide determination of both static and dynamic strain.

Thus, the method of this invention provides an extremely sensitive means for measuring strain in tiny specimens without contacting the specimen surface and can be used under extreme environmental conditions. The method permits measurement of local strain in intricate parts and provides a dynamic measure of strain.

Further objects, features and advantages of this invention will become apparent from a consideration of the following description, the appended claims, and the accompanying drawing in which:

Figure 1:
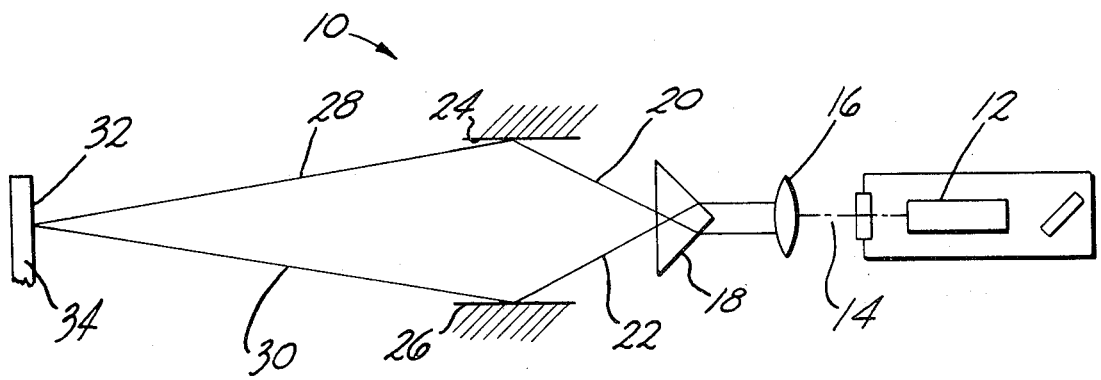
FIG. 1 is a diagrammatic view showing apparatus for forming thermally engraved gratings in the method of this invention.

With reference to the drawing, the apparatus for forming diffraction gratings in the noncontacting strain measurement method of this invention, indicated generally at 10, is illustrated in FIG. 1 as including a laser 12 capable of directing a beam 14 through a lens 16 and onto a prism 18 which splits the beam 14 into two divergent beams 20 and 22. Dielectric reflecting surfaces 24 and 26 are positioned in the paths of the beams 20 and 22 and located so that the beams 28 and 30 which are reflected therefrom are united at the surface 32 of a workpiece 34 which is to be measured for strain. The surfaces 24 and 26 are located so that there is a difference in the paths of the beams 28 and 30 less than the coherence length of the beams to thereby obtain a large fringe contrast at the surface 32. Also, in view of the large amounts of power used, the surfaces 24 and 26 are located so that the laser beams 20, 22, 28 and 30 make large angles with the surface normals so as to limit damage to these surfaces.

Figure 2:
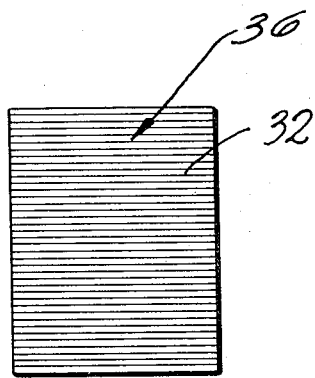
FIG. 2 is an elevational view of a grating produced by the apparatus shown in FIG. 1 on a planar surface.

As shown in FIG. 2, when the surface 32 is a planar surface, a diffraction grating 36 is formed thereon by the apparatus 10 which consists essentially of a large number of parallel closely spaced lines which actually represent grooves thermally engraved in the surface 32.

Figure 3:
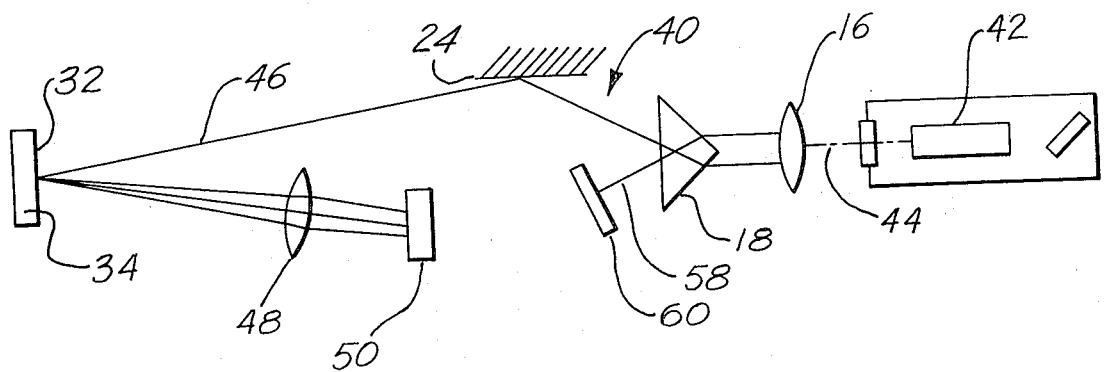
FIG. 3 is a diagrammatic view showing apparatus for measuring strain in an object according to the method of this invention.

Following the formation of a diffraction grating on the workpiece, the apparatus 40 of FIG. 3 may be used to measure strain in the workpiece. Many of the components of the apparatus 10 of FIG. 1 may be used in the apparatus 40 of FIG. 5. In this regard, like components are indicated by like numbers in both FIGS. 1 and 3.

The apparatus 40 of FIG. 3 utilizes a CW gas laser 42 positioned in the place of the giant pulse laser 12 of the apparatus 10 of FIG. 1 to provide a beam 44 of monochromatic light. The beam 44 of monochromatic light is transmitted through prism 18 and thereafter reflected off of the reflecting surface 24 to provide a monochromatic light beam 46 impinging obliquely on the surface 32 of specimen 34. The light beam 46 impinging on the surface 32 is diffracted off the specimen nominally along the same line as the line of incidence of beam 30 previously used during construction of the diffraction grating. A lens 48 is positioned to receive the light diffracted from the surface 32 of the workpiece 34 to provide a Fourier transform light distribution in its back focal plane. The Fourier transform light distribution may be viewed by virtue of a translucent screen 50 positioned at the back focal plane of lens 48.

Figure 4:
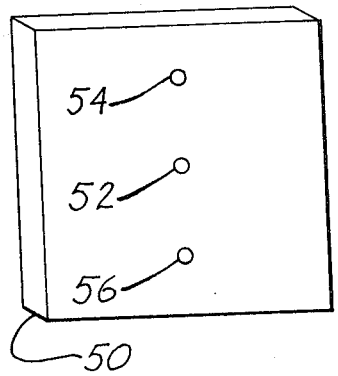
FIG. 4 is an illustration of a typical diffraction pattern formed on the output plane of the apparatus of FIG. 3.

A typical Fourier transform light distribution will appear on screen 50 as illustrated in FIG. 4. Particularly, the Fourier transform light distribution will typically include a DC or gross transmittance spot of light 52 flanked by first order diffracted light spots 54 and 56.

Since a second beam of light is not needed, the beam 58 from prism 18 may be blocked if desired by an opaque plate 60 positioned to receive the beam 58 and hence to prevent any obscuring effects that the beam may have on the light pattern appearing on the screen 50. As an alternative, the prism 18 may be replaced by a mirror or the like to provide only a single beam.

Prior to the straining of the specimen 34, the position(s) of either diffracted light spots 54, 56 or both should be recorded. After the workpiece 34 is strained along an axis which has a component perpendicular to the fringes 36, the diffraction pattern on screen 50 will change according to the amount of strain induced in the workpiece 134. Particularly, in the case of plane surfaces, diffracted light spots 54 and 56 will be displaced due to the strain in the workpiece. The displacement of diffracted light spots 54 and 56 will be inward for tensile strain and outward for compressive strain. The amount of displacement or shift of the diffracted light spots 54 and 56 is a measure of the amount of strain in a workpiece 134. The quantitative strain may be determined either by well-known mathematical expressions or by calibration of the apparatus 40 by first using a calibration specimen.

In the case of irregularly shaped surfaces, strain is determined by measuring intensity distribution of the diffracted light spots 54 and 56 before and after straining. The amount of diminution in the maximum intensity level at a selected point will be in accordance with the amount that the workpiece has been strained. It will be appreciated then that the intensity of the diffracted light spots 54 and 56 may be calibrated to measure the strain in the workpiece.

Figure 5:
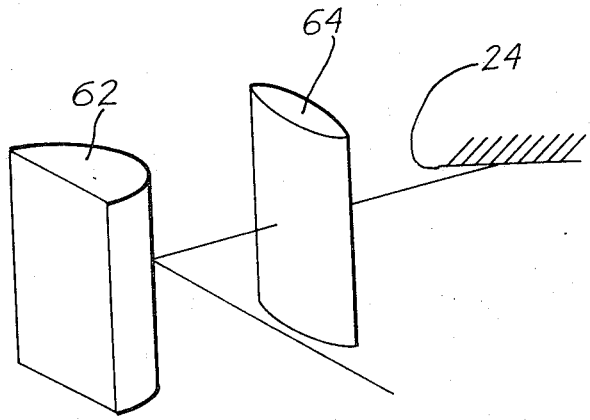
FIG. 5 is a diagrammatic view showing an alternative embodiment of the apparatus of FIG. 3 which may be used to measure strain on a cylindrical surface.

In the special case of a cylindrically shaped surface, the amount of strain would be determined by measuring the displacement of the first order diffracted light spots 54 and 56, as in the case of a plane surface, when the measuring apparatus of FIG. 5 is used. Particularly, the gratings are first inscribed perpendicular with respect to the axes of a cylindrical workpiece 62 by the apparatus 10 of FIG. 1. In measuring the strain, the apparatus 40 of FIG. 3 is modified by placing a lens 64 in a path of beam 46 to phase modulate the wave front in a manner such that it matches the configuration of the cylindrical surface of workpiece 62. The lens 64 should be positioned such that the light reflected from the cylindrical surface of workpiece 64 will have a plane parallel wave front. In this manner, stressing of the cylindrical workpiece 62 along its axes causes a shift in the location of the first order diffraction light spots as described with respect to plane surfaces.

From the above description, it is seen that this invention provides a noncontacting method for measuring strain which is advantageous because it enables strain measurement on irregularly shaped surfaces which are located in otherwise inaccessible areas. The results are reliable and repeatable.

It will be understood that the noncontacting method of measuring strain which is herein disclosed and described is presented for purposes of explanation and illustration and is not intended to indicate limits of the invention, the scope of which is defined by the following claims.

I claim:

1. The noncontacting method of measuring strain in a workpiece having a nonplanar surface by a means of a coherent optical process comprising the steps of:
    a. directing interfering beams from a laser source against said surface on the workpiece so as to thermally engrave a diffraction grating into said surface;
    b. illuminating said grating with a beam of coherent light originating from the location of said source;
    c. measuring the intensity distribution of light diffracted from said grating;
    d. subjecting said workpiece to strain; and
    e. measuring the change in said intensity distribution of said light diffracted from said grating to determine the amount of strain in said workpiece.

2. The method according to claim 1 wherein said surface is a cylindrical surface and wherein said grating is illuminated by a beam of coherent light having a wave front corresponding to said cylindrical surface.

3. The method according to claim 2 wherein said wave front corresponding to said cylindrical surface is provided by a cylindrical lens.

4. The method of claim 2 wherein said change in intensity distribution is measured by detecting displacement of a first order diffracted light spot.

* * * * *